Sept. 19, 1933.    T. H. JACOB    1,927,591
TRAILER HITCH
Filed May 22, 1931
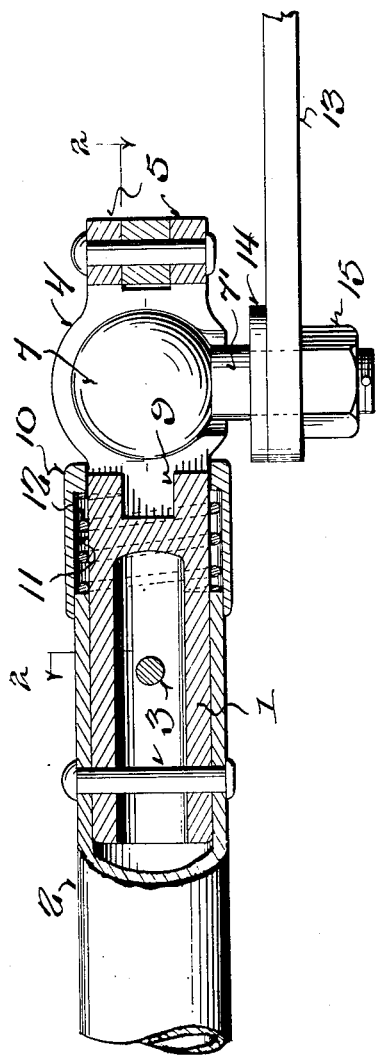
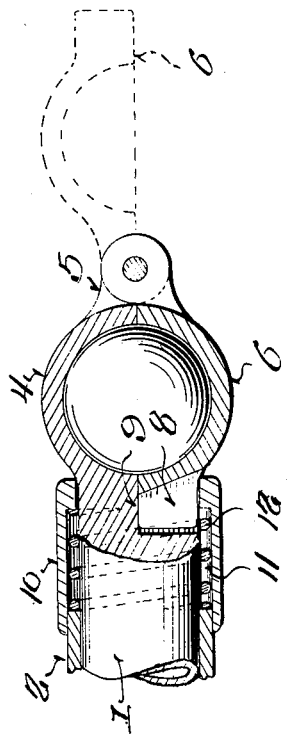

UNITED STATES PATENT OFFICE 1,927,591

TRAILER HITCH

Thomas H. Jacob, Wausau, Wis.

Application May 22, 1931. Serial No. 539,273

4 Claims. (Cl. 280—33.15)

This invention pertains to hitches, and more particularly to a hitch for automobile trailers.

The invention has primarily for its object to provide an exceedingly simple, inexpensive, positive, and flexible trailer hitch, which can be readily connected or detached without tools or mechanical operation, and which eliminates all possibility of accidental detachment, rattling, bending, or breakage.

Incidental to the foregoing, a more specific object resides in the provision of a hitch provided with a ball and socket joint, the socket being expansible to receive the ball, and being securely and positively locked in closed position by spring-urged means.

A more detailed object resides in the provision of a hitch of the foregoing character having a hinged socket normally locked in closed position by a spring-urged sleeve, which compensates for wear and eliminates rattling.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing, Figure 1 is a longitudinal section through a hitch constructed in accordance with the present invention; and Figure 2 is a fragmentary section taken on the line 2—2 of Figure 1.

Referring now more particularly to the accompanying drawing, the numeral 1 designates a shank for suitable attachment to the tongue of a trailer, and while this may be accomplished in numerous ways, it is preferred to provide the end of the trailer tongue (not shown) with a pipe or tubular extension 2 adapted to receive the shank 1, which is then secured to the extension 2 by rivets 3, or other suitable fastening means.

The end of the shank 1 is provided with a semi-spherical socket 4 having spaced ears 5 to which is pivotally connected a corresponding semi-spherical socket member 6, cooperating with the socket 4 to receive the ball 7. The free end of the socket member 6 is provided with a tongue extension 8, normally received in the recess 9 formed in the shank 1 adjacent the inner face of the socket 4.

In order to securely lock the socket on the ball 7, a sleeve 10 is inserted over the shank 1 for slidable engagement thereon, and naturally as the sleeve 10 is positioned over the tongue 8, the hinged socket member 6 is securely locked in closed position.

In order to retain the sleeve 10 in its locking position, the same is provided with an enlarged annular recess 11, which houses a compression spring 12 mounted on the shank 1, one end of the spring seating against the end of the recess 11, while the other end abuts the end of the tubular extension 2, thus urging the sleeve 10 over the tongue 8.

While various means may be employed for securing the ball to a car, truck, or tractor, a simple arrangement consists in securing a plate or draw-bar 13 to the vehicle for reception of the shank 7' depending from the ball 7. An annular flange 14, formed on the shank 7' seats on the draw-bar 13 and cooperates with the clamping nut 15 to rigidly secure the shank on the draw-bar.

It is believed that the operation of the present hitch will be quite apparent, in that it is merely necessary to draw the sleeve back far enough to release the tongue 8 in order to permit the socket member 6 to be swung open, as indicated by dotted lines in Figure 2. The socket 4 is then positioned upon the ball 7, and after closing the hinged section 6, the collar is released and urged to locking position by the spring 12.

From the foregoing explanation taken in connection with the accompanying drawing, it will be readily seen that an extremely simple, inexpensive, and efficient hitch has been provided, which eliminates all chance of accident or loss of the trailer, as it is impossible to accidentally detach the trailer tongue, regardless of the roughness of the road or the steepness of a grade. Jolts, jars, or jams cannot affect or loosen the socket, and inasmuch as the locking collar is under spring tension at all times, any wear occurring is compensated for, and rattling of the collar is eliminated.

The socket when closed provides a vise-like grip on the ball and yet allows for free relative movement in all directions between the ball and socket, thus eliminating strain and avoiding bending or damage to the hitch.

It is to be further understood that the salient feature of the present invention resides in the novel means provided for locking the socket in closed position, and therefore the socket has been illustrated and described as being secured to the trailer tongue with the ball connected with the car or truck. Such arrangement can be readily reversed without in any way affecting the operation or advantages of the invention.

I claim:

1. A trailer hitch comprising a shank provided at one end with a semi-spherical socket and a recess in said shank adjacent the inner face of said socket, a corresponding socket member hingedly connected to the first mentioned socket and provided with a tongue normally engaged in said recess, and a spring-urged sleeve slidably mounted on said shank for engagement over said tongue.

2. A trailer hitch comprising a ball and socket joint, the socket being formed in hinged sections, a sleeve slidably carried by one of the sections, said sleeve having an internal shoulder at one end, and a coiled spring mounted on one of said sections and engaging said shoulder to urge said sleeve over both of said sections for locking the same.

3. A trailer hitch comprising a horizontal shank provided at one end with a coaxial, semi-spherical socket and a recess adjacent the inner end of said socket, a complementary socket member horizontally hinged to the first mentioned socket and provided with a tongue normally engaged in said recess, and a spring-urged sleeve slidably mounted on said shank for engagement with said tongue.

4. A trailer hitch comprising a cylindrical shank provided at one end with a coaxial, semi-spherical socket, a complementary socket member hinged to the first mentioned socket and provided with an extension normally engaging said shank, and a spring-urged sleeve slidably mounted on said shank for engagement over said extension.

THOMAS H. JACOB.